US012655010B1

(12) United States Patent
Haberbusch

(10) Patent No.: US 12,655,010 B1
(45) Date of Patent: Jun. 16, 2026

(54) HYDROGEN LIQUEFACTION AND RECIRCULATION FOR VEHICLE REFUELING

(71) Applicant: NEOEx Systems, Inc., Amherst, OH (US)

(72) Inventor: Mark S. Haberbusch, Amherst, OH (US)

(73) Assignee: NEOEx Systems, Inc., Amherst, OH (US)

(*) Notice: Subject to any disclaimer, the term of this patent is extended or adjusted under 35 U.S.C. 154(b) by 10 days.

(21) Appl. No.: 18/744,976

(22) Filed: Jun. 17, 2024

Related U.S. Application Data

(63) Continuation-in-part of application No. 17/578,099, filed on Jan. 18, 2022, now Pat. No. 12,011,989.
(Continued)

(51) Int. Cl.
*B67D 7/54* (2010.01)
*B67D 7/04* (2010.01)
(Continued)

(52) U.S. Cl.
CPC ............... *B67D 7/80* (2013.01); *B67D 7/049* (2013.01); *B67D 7/54* (2013.01);
(Continued)

(58) Field of Classification Search
CPC . B67D 7/80; B67D 7/049; B67D 7/54; B67D 2007/0494
(Continued)

(56) References Cited

U.S. PATENT DOCUMENTS 1,869,487 A 8/1932 Leon et al.
3,603,480 A 9/1971 Irie et al.
(Continued)

FOREIGN PATENT DOCUMENTS

EP 0721425 B1 * 8/1997 ........... B67D 7/0266
KR 20200073956 A 6/2020
(Continued)

OTHER PUBLICATIONS

International Search Report issued in corresponding International Application No. PCT/US2025/033865 mailed Sep. 11, 2025.

*Primary Examiner* — Kenneth Rinehart
*Assistant Examiner* — Stephanie A Shrieves
(74) *Attorney, Agent, or Firm* — Renner, Otto, Boisselle & Sklar, LLP

(57) ABSTRACT

A refueling system for vehicles may include an inlet tube configured to fluidly connect to a container containing gaseous hydrogen, a cryocooler including a cold tip and a cold head, the cold tip configured to be driven to a hydrogen liquefaction temperature of between 20 and 25 K by the cold head, a condensation coil fluidly connected to the inlet tube to receive the gaseous hydrogen and thermally connected to the cryocooler cold tip, a nozzle fluidly connected to the condensation coil and configured to receive liquid hydrogen from the condensation of the gaseous hydrogen; and a coupling mechanism fluidly connected to the nozzle to receive the liquid hydrogen wherein the nozzle is downwardly movable to fluidly connect from above to an upwards facing tank inlet of a vehicle.

12 Claims, 18 Drawing Sheets

Related U.S. Application Data

(60) Provisional application No. 63/138,468, filed on Jan. 17, 2021.

(51) Int. Cl.
*B67D 7/80* (2010.01)
*F17C 5/00* (2006.01)
*F17C 5/02* (2006.01)

(52) U.S. Cl.
CPC ........ *B67D 2007/0494* (2013.01); *F17C 5/00* (2013.01); *F17C 5/02* (2013.01)

(58) Field of Classification Search
USPC ............................................................ 141/82
See application file for complete search history.

(56) References Cited

U.S. PATENT DOCUMENTS

| | | | | | |
|---|---|---|---|---|---|
| 3,946,572 | A | | 3/1976 | Bragg | |
| H297 | H | | 7/1987 | Schultz | |
| 4,986,446 | A | | 1/1991 | Montgomery et al. | |
| 5,269,468 | A | | 12/1993 | Adiutori | |
| 5,301,723 | A | * | 4/1994 | Goode | F17C 5/02 141/69 |
| 5,353,849 | A | | 10/1994 | Sutton et al. | |
| 5,404,923 | A | | 4/1995 | Yamamoto | |
| 5,505,237 | A | | 4/1996 | Magne | |
| 5,548,962 | A | | 8/1996 | Luger et al. | |
| 5,589,020 | A | | 12/1996 | Varghese | |
| 5,655,578 | A | * | 8/1997 | Farkas | B60K 15/04 141/7 |
| 5,771,946 | A | | 6/1998 | Kooy et al. | |
| 5,971,040 | A | | 10/1999 | McFarland et al. | |
| 6,024,074 | A | | 2/2000 | Koethe | |
| 6,237,647 | B1 | | 5/2001 | Pong et al. | |
| 6,269,848 | B1 | | 8/2001 | Corfitsen | |
| 6,382,269 | B1 | | 5/2002 | Tatsuno | |
| 6,513,837 | B2 | | 2/2003 | Fujikawa et al. | |
| 6,923,008 | B2 | | 8/2005 | Brook et al. | |
| 7,028,724 | B2 | | 4/2006 | Cohen et al. | |
| 7,082,969 | B1 | | 8/2006 | Hollerback | |
| 7,093,626 | B2 | | 8/2006 | Li et al. | |
| 7,213,400 | B2 | | 5/2007 | Dickerson | |
| 7,296,601 | B2 | | 11/2007 | Webb | |
| 7,316,242 | B2 | | 1/2008 | Porter et al. | |
| 7,318,327 | B2 | * | 1/2008 | Dickerson | F25J 1/0225 62/615 |
| 8,056,860 | B2 | | 11/2011 | Small et al. | |
| 8,164,302 | B2 | | 4/2012 | Capizzo | |
| 8,291,717 | B2 | | 10/2012 | Radovinsky | |
| 8,393,362 | B1 | | 3/2013 | Hollerback | |
| 8,667,690 | B2 | | 3/2014 | Cajiga et al. | |
| 8,939,396 | B2 | | 1/2015 | Geneste | |
| 8,991,444 | B2 | | 3/2015 | Boutet et al. | |
| 9,181,078 | B2 | | 11/2015 | Cajiga et al. | |
| 10,029,803 | B1 | | 7/2018 | Larsen | |
| 10,309,718 | B2 | | 6/2019 | Kim | |
| 10,429,857 | B2 | | 10/2019 | Weaver et al. | |
| 10,773,822 | B2 | | 9/2020 | Haberbusch et al. | |
| 10,793,417 | B2 | * | 10/2020 | Homann | B67D 7/0478 |
| 10,981,666 | B1 | | 4/2021 | Haberbusch et al. | |
| 2001/0054818 | A1 | | 12/2001 | Fujikawa et al. | |
| 2004/0055642 | A1 | | 3/2004 | Valentian | |
| 2006/0026969 | A1 | | 2/2006 | Brook | |
| 2010/0019090 | A1 | | 1/2010 | Mouskis et al. | |
| 2013/0305744 | A1 | * | 11/2013 | Laursen | B01D 7/02 62/6 |
| 2015/0123462 | A1 | | 5/2015 | Kamradt | |
| 2016/0231049 | A1 | * | 8/2016 | Baik | F28D 15/0233 |
| 2017/0050749 | A1 | | 2/2017 | Pilskalns | |
| 2017/0341769 | A1 | * | 11/2017 | Haberbusch | F17C 5/007 |
| 2018/0196418 | A1 | | 7/2018 | Meier et al. | |
| 2018/0229852 | A1 | | 8/2018 | Boss et al. | |
| 2018/0312390 | A1 | | 11/2018 | Homann et al. | |
| 2019/0077521 | A1 | | 3/2019 | Kelly et al. | |
| 2020/0180940 | A1 | | 6/2020 | Rainville | |
| 2020/0318895 | A1 | | 10/2020 | Kiener | |

FOREIGN PATENT DOCUMENTS

| | | | | | |
|---|---|---|---|---|---|
| KR | 20210122390 | A | * | 10/2021 | F25J 1/0244 |
| WO | 2007/059781 | A1 | | 5/2007 | |
| WO | WO-2023226639 | A1 | * | 11/2023 | F25J 1/0245 |

* cited by examiner

HYDROGEN LIQUEFACTION AND RECIRCULATION FOR VEHICLE REFUELING

CROSS REFERENCE TO RELATED APPLICATIONS

This application is a continuation-in-part of and claims priority of U.S. patent application Ser. No. 17/578,099, filed Jan. 18, 2022, which claims priority of U.S. Provisional Patent Application No. 63/138,468, filed Jan. 17, 2021, each of which is hereby incorporated herein by reference in its entirety.

BACKGROUND

Liquid hydrogen is typically provided by compressed gas suppliers and their distributors to their customers. Large liquid hydrogen storage Dewars are either permanently installed on the customer site or transported to the customer site and temporarily left on the customer site for use until empty. These storage Dewars then require an extensive set of ground support equipment to transfer the hydrogen between the storage Dewar and where the customer is using the liquid hydrogen for product development or validation. The ground support equipment usually includes long lengths of vacuum jacketed piping and valves. This equipment along with the storage Dewar that are expensive to purchase or rent, custom made, and require a large footprint of land to sit on. This land must be modified to meet certain compressed gas supplier requirements based on best practices and standards. Modifications may include such things as a cement pad and secure fencing. In addition, a substantial amount of land is needed for the liquid hydrogen delivery trailers to maneuver. All of these hardware requirements and land usage are cost prohibited to those that only require a small amount of liquid hydrogen (less than 100 L). In addition, remote locations logistically do not have access to gaseous hydrogen or liquid hydrogen at all.

As a result, obtaining small quantities of liquid hydrogen to conduct experiments and validate prototypes of products that store and use liquid hydrogen and conduct flight operations in remote locations has been determined to be cost prohibitive with many logistical and legal barriers. There is a demand for a system for making small quantities of liquid hydrogen at relatively low cost with relatively small amount of hardware required.

SUMMARY OF THE INVENTION

To this end, an invention is disclosed that addresses these issues by taking room temperature gaseous hydrogen in high pressure bottles that are commercially available at reasonable prices or gaseous hydrogen generated locally and liquefying the hydrogen using a cryocooler directly on top of a closely coupled Unmanned Aerial Vehicle (UAV) flight Dewar.

The systems disclosed herein will enable extremely long-duration (20 hours)/long-range (1,000 miles) operations for Unmanned Aerial Vehicles. This UAV liquid hydrogen energy storage technology combined with fuel cell produced electrical power is scalable for commercial UAVs operating at less than 55 lbs. all the way up to Personal Air Vehicles or flying cars. The technology disclosed herein may work in combination with systems and processes for refueling the UAV flight Dewar patented by NEOEx as U.S. Pat. Nos. 10,773,822 and 10,981,666, the disclosures of which are hereby incorporated by reference in their entirety.

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
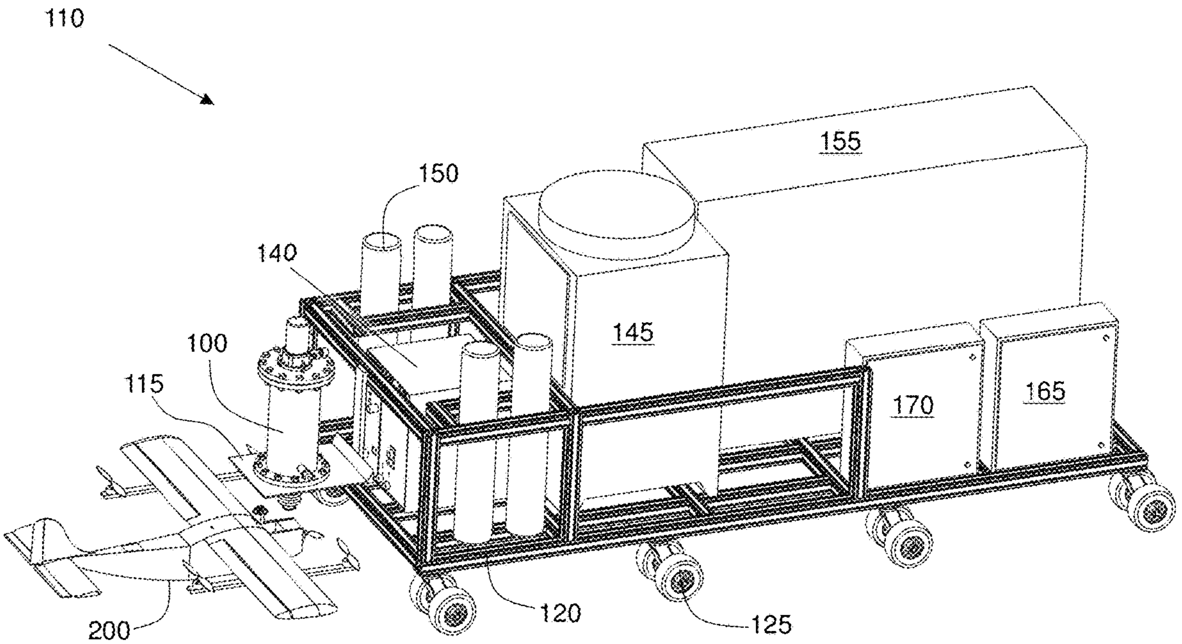
FIG. 1 illustrates a perspective view of an exemplary system for refueling a vehicle.

FIG. 1 illustrates an exemplary system 110 for refueling a vehicle 200. The system 110 may include a frame or skid 120 which may include wheels or casters 125 for facilitating transport of the system 110. The system 110 may include an apparatus 100 for direct liquefaction of hydrogen, as described in detail below. The apparatus 100 may be installed on a hydraulic, pneumatic, or electric powered lift 115 for lifting and lowering the apparatus 100. The system 110 may also include a compressor 140, a chiller 145, gas storage 150, a generator 155, an energy storage (batteries) cabinet 165, and an instrumentation and controls cabinet 170. The system 110 is described herein for contextual purposes and is not meant to limit the herein disclosed apparatus 100 for direct liquefaction of hydrogen.

Figure 2A:
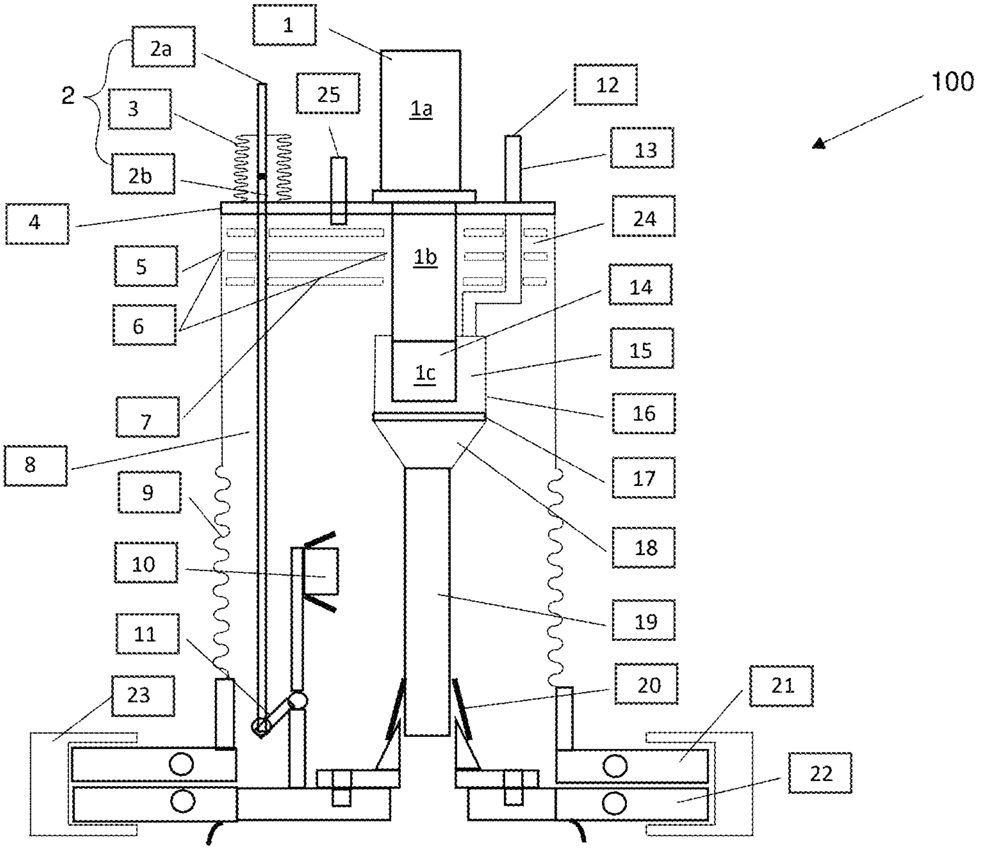
FIG. 2A illustrates a schematic drawing of an exemplary apparatus for direct liquefaction of hydrogen into a flight Dewar.

FIG. 2A illustrates a schematic drawing of an exemplary apparatus 100 for direct liquefaction of hydrogen into a flight Dewar. The apparatus 100 may be used for producing liquid hydrogen without the need for vacuum jacketed transfer hoses. The apparatus 100 is compact and may be designed to interface with the systems and methods for the transfer of cryogenic fluids disclosed in U.S. Pat. Nos. 10,773,822 and 10,981,666. The apparatus 100 may include a cryocooler 1 that includes cold head 1*a*, a middle portion 1*b*, and a cold tip 1*c*, an actuator rod 2 (including a top portion 2*a* and a bottom portion 2*b*), bellows 3 for the actuator rod 2, a cryocooler mounting flange 4, a liquefier chamber 5 that in itself may be constructed of a vacuum jacketed insulated wall, radiation shield wall seals 6, radiation shields 7, insulation (aerogel with multilayer insulation) 8, main bellows 9, a cap 10 with compression fitting features, a cap arm hinge mechanism 11, a hydrogen gas inlet 12, cryogenic foam insulation (polyurethane) 13, an ortho-to-para conversion catalyst 15, a condensation chamber 16, a mesh screen filter 17, a drain funnel 18, a liquid transfer tube nozzle 19 (shown in FIG. 1 in refueling configuration), a transfer tube nozzle compression fitting 20, a coupling flange 21, a tank flange 22, a flange clamp 23, a vacuum space 24, and a vacuum port 25.

The direct hydrogen liquefaction apparatus coupling flange 21 may be connected to the tank flange 22 and held together by the flange clamp 23. A vacuum may be created in the vacuum space 24 through the vacuum port 25 to eliminate any air and moisture in the system and to improve the performance of the insulation 8. The cap 10 that is normally closed on the UAV liquid hydrogen flight tank may then be pressed open using the actuator rod 2 via the cap arm hinge mechanism 11. The actuator arm 2 may be made of two materials to minimize heat leak towards the flight tank. For example, the actuator arm's upper portion 2*a* may be made of stainless steel or similar material and the lower portion 2*b* may be made of a composite material such as G10 high-pressure fiberglass laminate composite or similar material for low thermal conductivity and high strength at cryogenic temperatures. A stainless-steel flexure bellows 3 may be attached to the rod 2.

Radiation shields 7 may be located at the top of the liquefier chamber 5 to keep the cryocooler mounting flange 4 from getting cold. Radiation shield wall seals 6 of a compliant seal material (e.g., Kapton) may be located against the walls of the liquefier chamber 5 and the cryocooler 1*b* to keep convective flows from forming and increasing heat transfer. A bellows 9 may be used to provide flexibility in independently moving and connecting the liquid transfer tube nozzle 19 and the actuator rod 2.

Cold gaseous hydrogen that is pre-chilled using a liquid nitrogen bath or another cryocooler may be introduced into the liquefier chamber 5 through the cold gaseous hydrogen inlet tube 12 that may be insulated with cryogenic temperature rated foam 13 (e.g., two-part polyurethane foam). The gaseous hydrogen coming in should be at a steady state condition of ortho to para hydrogen concentration at a temperature of 80 K or lower. This can be achieved by running the gaseous hydrogen through an ortho to para conversion catalyst at 80 K.

The cold gaseous hydrogen may then enter the condensation chamber 16 around and cooled by the cryocooler cold tip 1*c*. The cryocooler cold tip 1*c* may be driven to the hydrogen liquefaction temperature of between 20 and 25 K by the cryocooler cold head connected to a compressor (not shown). Further ortho-to-para hydrogen conversion may be conducted using the catalyst 15 and the cryocooler cold tip 1*c* absorbs the exothermic reaction. Liquid may then drip into the funnel 18 by gravitational force and into the liquid transfer tube nozzle 19. The liquid transfer nozzle compression fitting 20 seals onto the tank flange 22. Any vapor that is generated as the system is cooled down will rise back into the condensation chamber 16 and re-condense. The cold hydrogen inlet 12 is maintained at a constant pressure of approximately 50 psia or below.

System 100 achieves liquefaction from above the flight tank, eliminating the need for vacuum jacketed transfer hoses. Room temperature gaseous hydrogen may be procured in high pressure bottles (commercially available at reasonable prices) and the gaseous hydrogen therein turned into liquid hydrogen locally at the refueling site (and indeed right above the aircraft fuel tank inlet) using a cryocooler above a closely coupled UAV flight Dewar. This approach lowers the cost and amount of hardware.

Figure 2B:
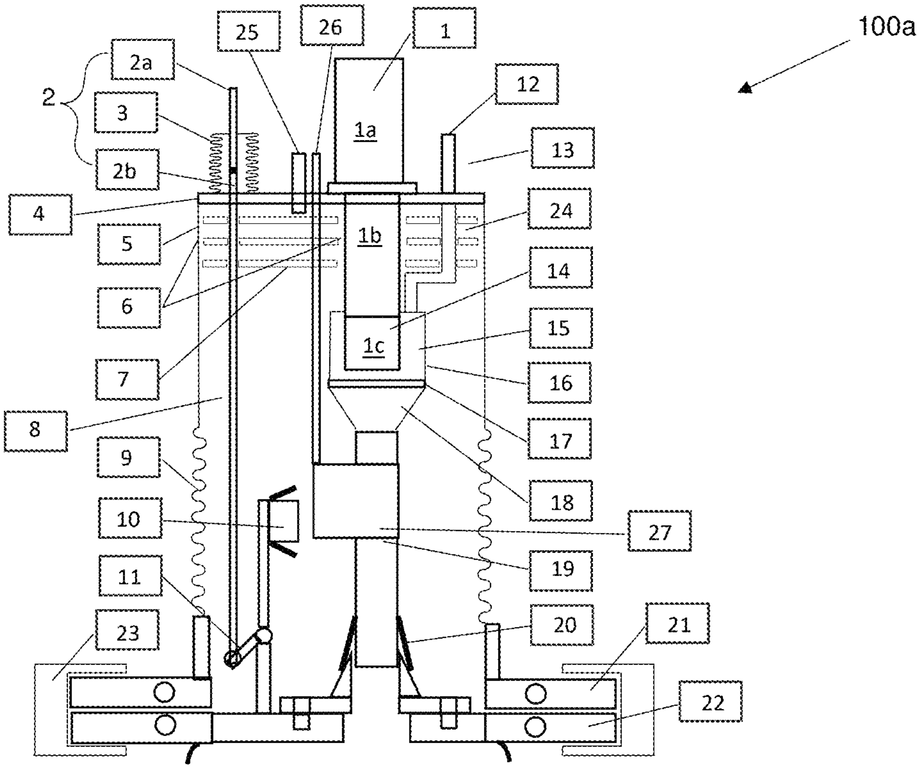
FIG. 2B illustrates a schematic diagram of an exemplary alternative version of the direct liquid hydrogen apparatus with the addition of an isolation valve.

FIG. 2B illustrates a schematic diagram of an exemplary alternative version of the direct liquid hydrogen apparatus 100*a* with the addition of an isolation valve 27 that fluidly traverses the liquid transfer nozzle 19. The valve 27 may be pneumatically actuated using gaseous helium because the gas does not condense at 20 K.

Figure 2C:
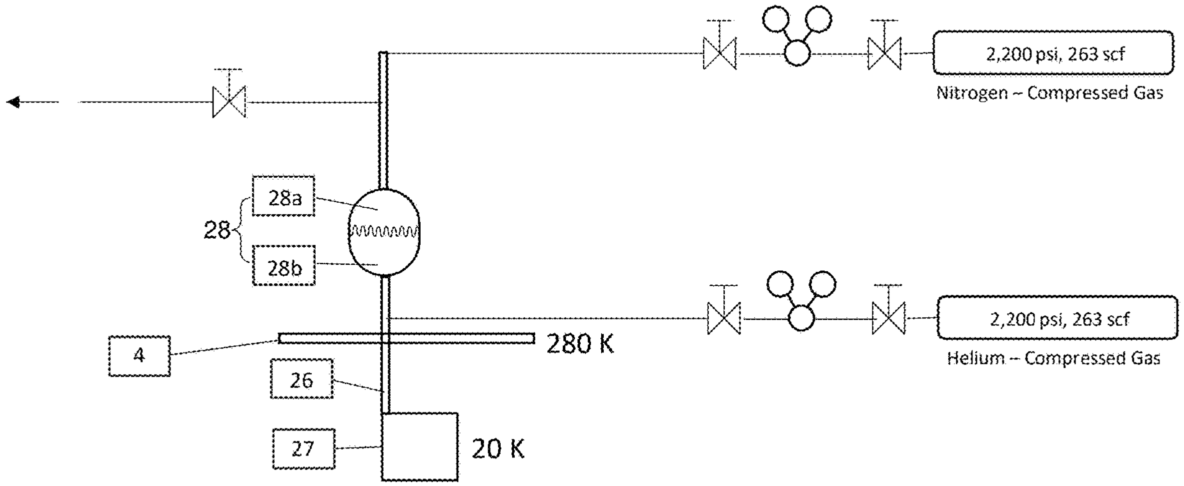
FIG. 2C illustrates a schematic diagram of an exemplary actuator system that works with the system.

FIG. 2C illustrates a schematic diagram of an exemplary actuator system 200 that works with the system 100*a*. Helium is a non-renewable resource. This invention will minimize the use of helium in cryogenic hydrogen system 100*a* by eliminating the loss of helium in the actuator when the valve 27 is opened and closed.

The helium saver actuator system 200 may include a pneumatic bladder 28 that is operably connected to the valve 27 and is divided in two halves 28*a*, 28*b*. The first half 28*a* has gaseous nitrogen in it and the second half 28*b* has gaseous helium in it. The bladder 28 operates at room temperature. The pneumatic valve 27 is normally closed and actuated by a spring. Helium pressure is required to counter the spring force to open the valve 27. The helium half 28*b* of the bladder is charged up to operating pressure via one or more tubes 26 just prior to opening the valve 27. Nitrogen pressure is supplied via the one or more tubes 26 to the other half 28*a* of the bladder which pressurizes the helium side and opens the valve 27. Nitrogen pressure may then be relieved via the one or more tubes 26 and vented to the atmosphere to close the valve 27.

An alternative would be to replace the pneumatically actuated valve 27 with an electric solenoid valve that can operate at 20 K. This would eliminate all use of helium. The helium tube 26 would be replaced with electrical power leads to the solenoid actuator.

Figure 3:
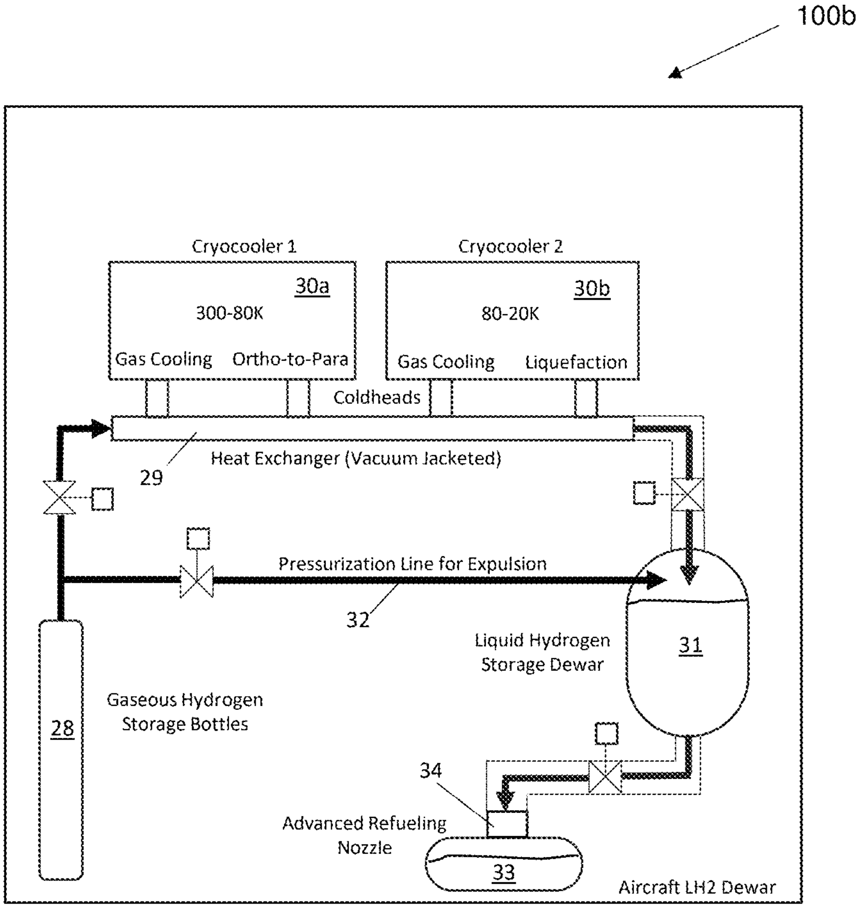
FIG. 3 illustrates a schematic diagram of yet another exemplary alternative version of the direct liquid hydrogen apparatus.

FIG. 3 illustrates a schematic diagram of yet another exemplary alternative version of the direct liquid hydrogen apparatus 100*b*. The system 100*b* involves flowing high pressure gaseous hydrogen 28 through a series of heat exchangers 29 thermally attached to various cryocoolers 30*a*, 30*b*. Each cryocooler 30*a*, 30*b* is specifically sized to reduce the gas temperature, remove heat of the ortho-to-para hydrogen conversion process, and then liquefy the gas. In this scenario the liquid is stored in a Dewar 31 at low pressure and then, once filled, is transferred via pressure 32 into the UAV 33 using the apparatus 34 patented in U.S. Pat. Nos. 10,773,822 and 10,981,666.

Figure 4A:
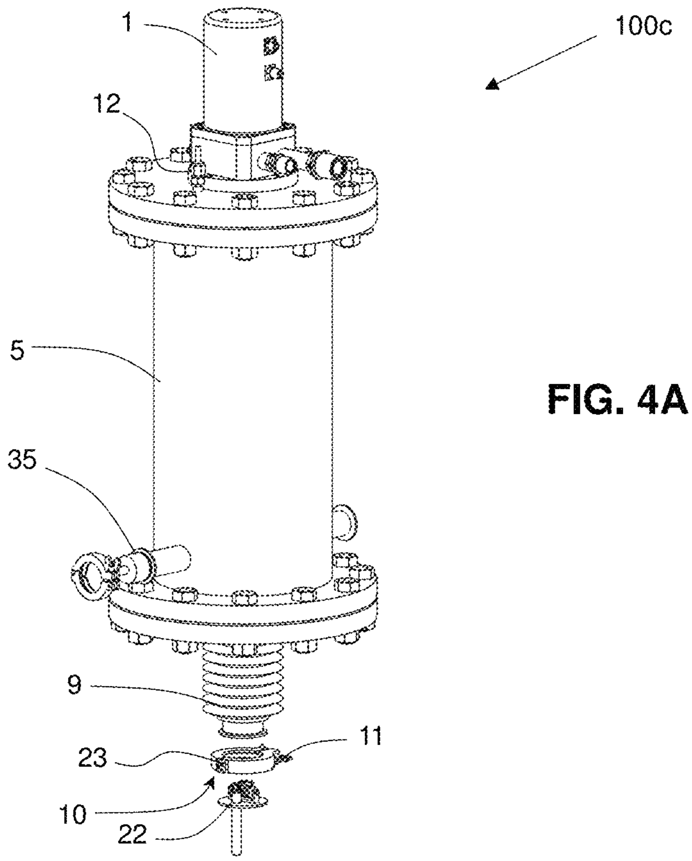
FIG. 4A illustrates a perspective view of an exemplary alternative version of the direct liquid hydrogen apparatus with the addition of a rotary feed through for a mechanical isolation valve.
Figure 4B:
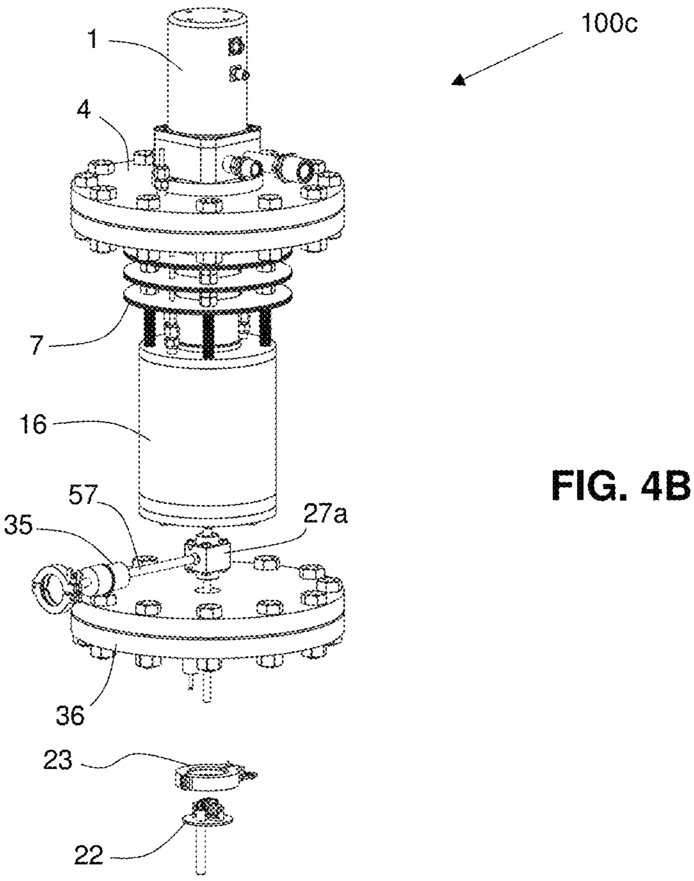
FIG. 4B illustrates a transparent perspective view of the exemplary alternative version of the direct liquid hydrogen apparatus with the addition of a mechanically driven isolation valve.
Figure 4C:
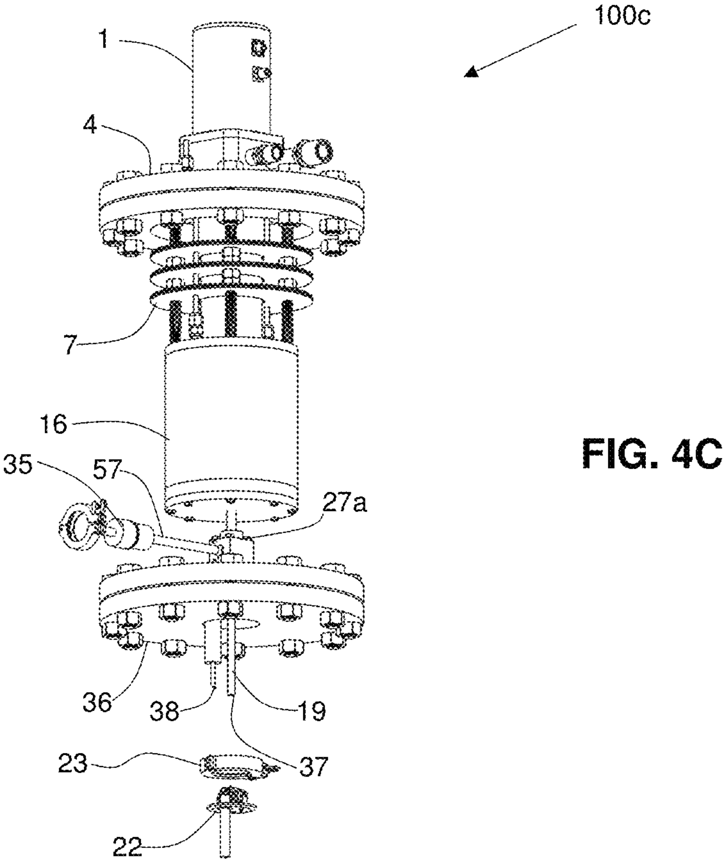
FIG. 4C illustrates a transparent perspective view of the exemplary alternative version of the direct liquid hydrogen apparatus with the addition of a fill level sensor incorporated into the fill tube nozzle.

FIG. 4A illustrates a perspective view of an exemplary alternative version of the direct liquid hydrogen apparatus 100*c* with the addition of a rotary feed through 35 for a mechanically actuated liquid hydrogen isolation valve 27*a* (shown in FIGS. 4B and 4C). The rotary feed through 35 enables the use of a manual or automated actuator to open and close the liquid hydrogen isolation valve 27*a*.

FIG. 4B illustrates a transparent perspective view of the exemplary alternative version of the direct liquid hydrogen apparatus 100*c* with the addition of a mechanically driven isolation valve 27*a* connected to a rotary feed through 35 via a rotary actuator rod 57.

FIG. 4C illustrates a transparent perspective view of the exemplary alternative version of the direct liquid hydrogen apparatus 100*c* with the addition of a fill level sensor 37 incorporated into the liquid transfer tube nozzle 19. The sensor 37 enables accurate filling of the flight tank using ground support equipment thus reducing the amount of sensing hardware on the flight vehicle. The fill level sensor 37 senses a fill level of the vehicle's tank and communicates the information. Fueling may be terminated upon the sensor 37 detecting a certain fuel level in the tank. FIG. 4C also shows the cap opener plunger 38.

Figure 5A:
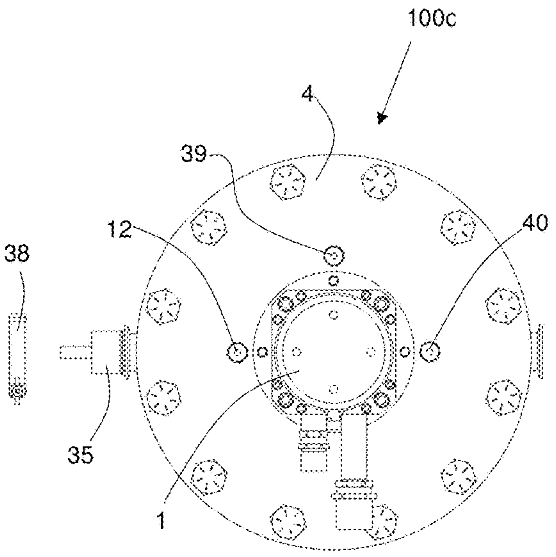
FIG. 5A illustrates a top view of an exemplary alternative version of the direct liquid hydrogen apparatus with the addition of feed throughs for a cryocooler temperature sensor and heater.

FIG. 5A illustrates a top view of the exemplary alternative version of the direct liquid hydrogen apparatus 100*c* with the addition of feed throughs 40 and 39 for a cryocooler temperature sensor 45 and heater 44, respectively, for controlling the cryocooler cold tip 1*c* temperature during the hydrogen liquefaction process.

Figure 5B:
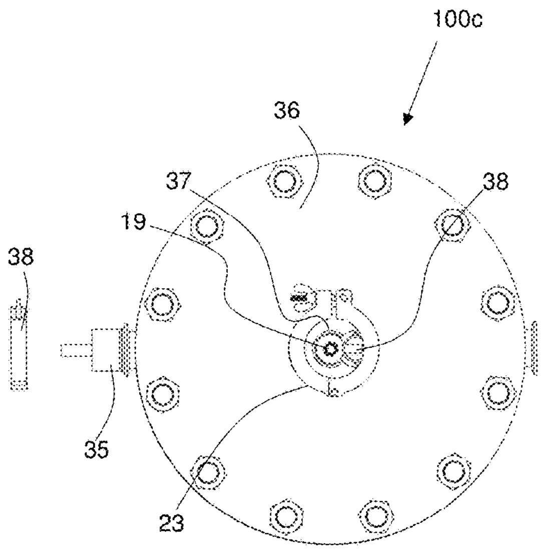
FIG. 5B illustrates a bottom view of an exemplary bottom view of the direct liquid hydrogen apparatus.
Figure 6A:
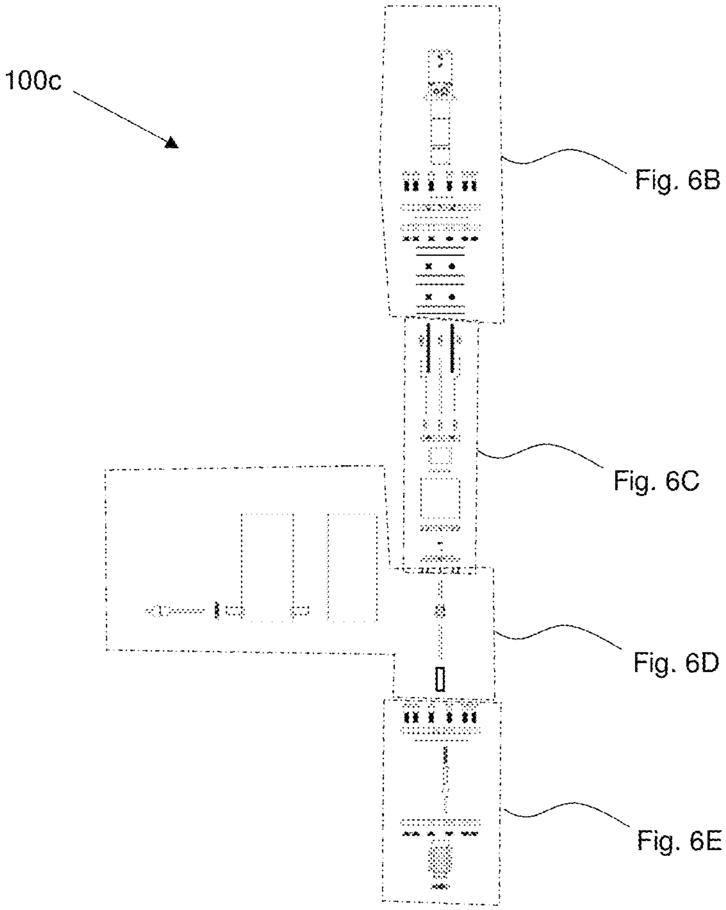
FIG. 6A illustrates a perspective view exploded view of the direct liquid hydrogen apparatus in various sections.
Figure 6B:
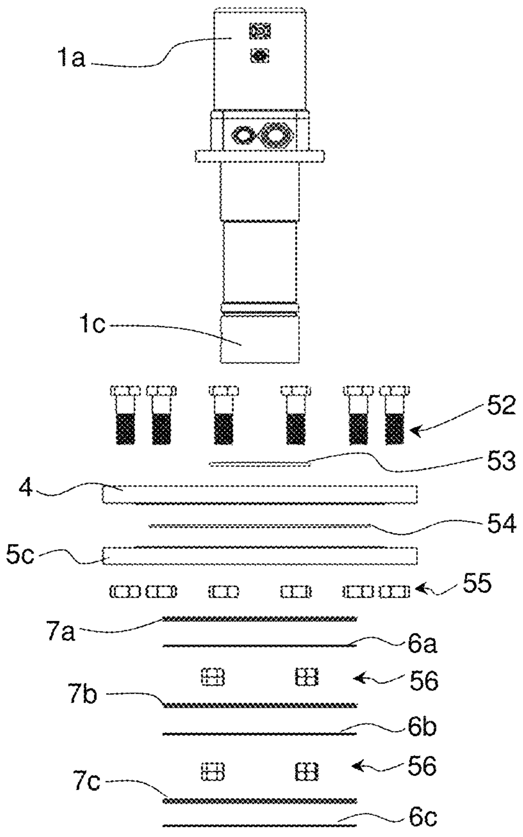
FIG. 6B illustrates an exploded view of the top section of the direct liquid hydrogen apparatus.
Figure 6C:
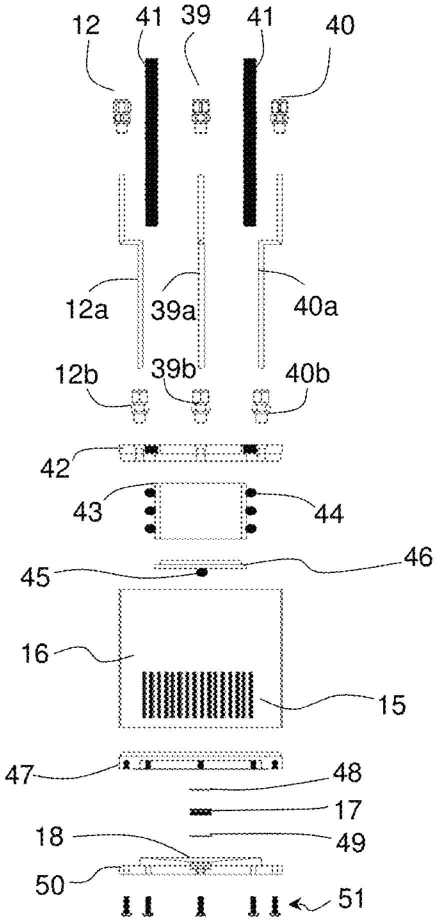
FIG. 6C illustrates an exploded view of the top middle section of the direct liquid hydrogen apparatus.
Figure 6D:
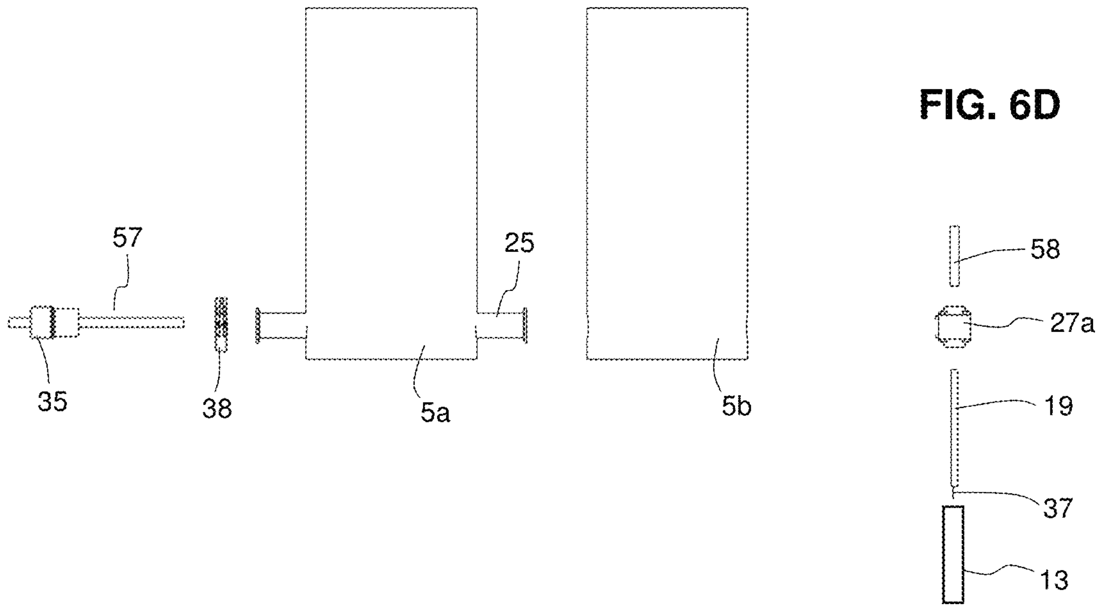
FIG. 6D illustrates an exploded view of the bottom middle section of the direct liquid hydrogen apparatus.
Figure 6E:
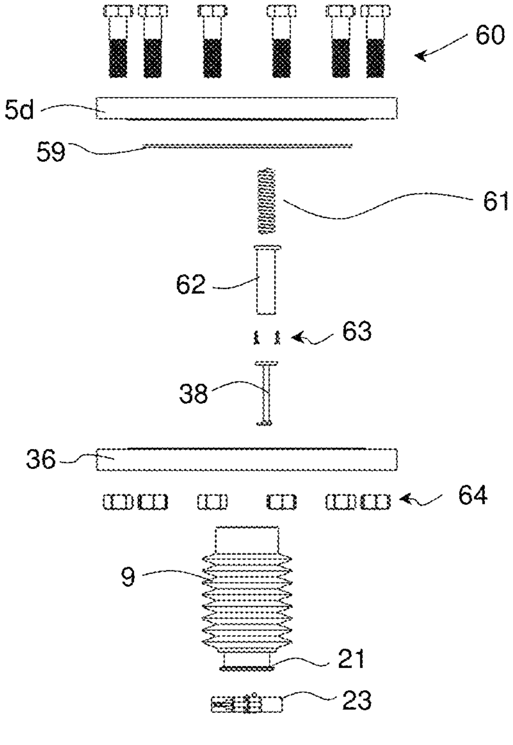
FIG. 6E illustrates an exploded view of the bottom section of the direct liquid hydrogen apparatus.

FIG. 5B illustrates a bottom view of a perspective view of the exemplary alternative version of the direct liquid hydrogen apparatus 100*c* with the addition of the fill level sensor 37 integrated into the liquid transfer tube nozzle 19 and the bellows mounting flange 36 that connects the bellows 9 to the bottom of the liquefier chamber 5 via the liquefier chamber bottom flange 5*d* as shown in FIG. 6E.

FIG. 6A illustrates an exploded view of the exemplary direct liquid hydrogen apparatus 100*c* in four sections that would be described in more detail in FIGS. 6B-6E. Insulation of the various cryogenic parts in each section is not shown.

FIG. 6B illustrates an exploded view of the top section of the direct liquid hydrogen apparatus. The cryocooler cold head 1*a* is installed into the cryocooler mounting flange 4 and is sealed to 4 using cryocooler flange seal 53. The cryocooler mounting flange is attached to the liquefier chamber top flange 5*c* using bolts 52 and nuts 55 and is sealed using cryocooler mounting flange seal 54. Radiation shields 7*a*, 7*b*, and 7*c* are mounted to the bottom of flange 4 using threaded rods 41 shown in FIG. 6C. Space nuts 56 are used to separate and hold the radiation shields in place. Radiation shield wall seals 6*a*, 6*b*, and 6*c* are used to minimize convection along the liquefier chamber 5 wall.

FIG. 6C illustrates an exploded view of the top middle section of the direct liquid hydrogen apparatus 100*c*. Split seal fittings are used as feed throughs for cold gaseous hydrogen 12, cold tip heater power wires 39, and cold tip temperature measurement wires 40. Tubes 12*a*, 39*a*, and 40*a* are used to connect 12, 39, and 40 to the condensation chamber 16 split seal fitting feed throughs 12*b*, 39*b*, and 40*b*. The condensation chamber 16 consists of a top flange 42 constructed of stainless steel, an inner wall 43 constructed of oxygen-free high thermal conductivity (OFHC) copper, an inner wall flange 46 constructed of OFHC copper, the condensation chamber outer wall 16 is constructed of stainless steel, the filter flange 47 constructed of stainless steel, and the condensation bottom flange 50 constructed of stainless steel. The condensation bottom flange 50 features a drain funnel 18, mesh screen filter 17, top flange 48 for holding filter 17, and a bottom flange 49 for holding filter 17. Bolts 51 hold the condensation chamber bottom flange 50 to the filter flange 47 and are sealed using a copper gasket and serrated sealing surfaces (not shown). Ortho-to-para hydrogen catalyst 15 is installed inside the condensation chamber. A heater 44 is mounted to the external wall of the condensation chamber inner wall 43 to control the temperature of the inner wall based on temperature measurements from temperature sensor 45.

FIG. 6D illustrates an exploded view of the bottom middle section of the direct liquid hydrogen apparatus. The liquid hydrogen isolation valve 27*a*, which can be a cryogenic ball valve, is mechanically actuated using a rotary actuator rod 57 and a rotary feed through 35. A manual or automated actuator (not shown) on the outside of the liquefier chamber 5 can be used to open and close valve 27*a*. The rotary feed through is mounted to the liquefier chamber outer vacuum wall 5*a* via a vacuum clamp 38. A vacuum port 25 is used to pull vacuum inside the liquefier chamber. A separate vacuum pump out not shown is used to pull vacuum between the liquefier chamber outer vacuum wall 5*a* and the inner vacuum wall 5*b*. Liquid hydrogen generated in the condensation chamber 16 drains via gravity through the liquid transfer tube 58, liquid hydrogen isolation valve 27*a*, and the liquid transfer nozzle 19 into the flight tank not shown. The fill level sensor 37 is used to accurately measure the full level of the tank. The fill tube insulation 13 insulates the liquid transfer nozzle 19.

FIG. 6E illustrates an exploded view of the bottom section of the direct liquid hydrogen apparatus. The figure shows the bellows mounting flange 36 is attached to the liquefier chamber bottom flange 5*d* using bolts 60 and nuts 64. The flanges 5*d* and 36 are sealed using seal 59. Bellows 9 is attached to the bellows mounting flange 36 on one end and to a coupling flange 21 at the other end. The coupling flange 21 is attached to the tank flange 22 using flange clamp 23. The tank cap is opened using the cap opener plunger 38 and a compression spring 61 housed inside the spring housing 62. The spring housing 62 is mounted to the liquefier chamber bottom flange 5*d* using bolts 63.

Figure 7:
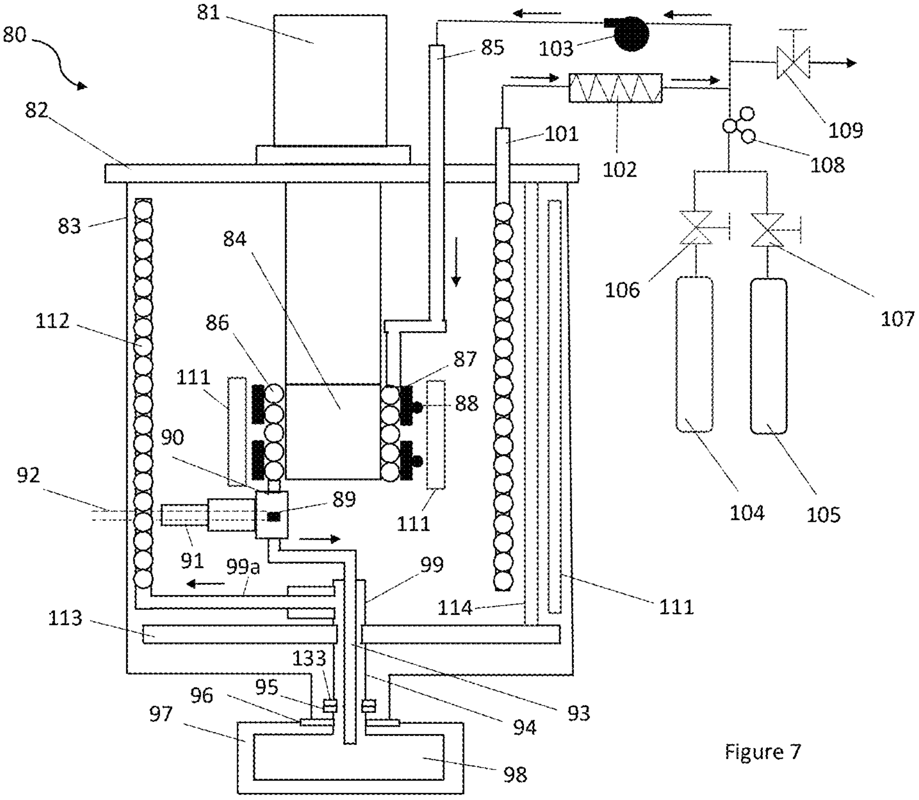
FIG. 7 illustrates an alternat embodiment of an exemplary system for refueling a vehicle that includes a recycle stream.

FIG. 7 shows an alternate embodiment of the refueling system 80 that includes a hydrogen recirculation loop. The system 80 includes a cryocooler that includes a cold head 81 (comparable to cold head 1*a* in FIG. 2A) installed on the top plate 82 of the liquid hydrogen recirculation apparatus 80. The cryocooler cold tip 84 (comparable to cold tip 1*c* in FIG. 2A) operates in a temperature range between 25 K and 12 K to liquify hydrogen that is introduced at a steady flow rate at ambient temperature through inlet 85 (comparable to inlet 12 in FIG. 2A). A coiled heat exchanger 86 is wrapped around the cryocooler cold tip 84. The coiled heat exchanger 86 can be made out of copper, preferably oxygen free high thermal conductivity copper, less preferably 101 copper, less preferably 122 copper. Heat exchanger tubing is wrapped as tight as possible onto the cold tip 84 with each successive wrap in physical contact with the cold tip 84 and the adjacent wrap. The coiled heat exchanger 86 is mechanically clamped to the cold tip 84 using one or more mechanical fasteners 87. The fastener 87 can be any fastener known in the art, such as a spring clamp, but is preferably a constant-tension bolt clamp 88, preferably made of 316-grade stainless steel. Stainless steel is a preferred clamping material as it is not as thermally conductive as the copper heat exchanger and improves the efficiency of the cooling process. Temperature fluctuations can cause the expansion of the heat exchanger 86 and cause it to pull away from, and lose contact with, the cold tip 84. The fastener 87 maintains tension or force on the heat exchanger 86 to maintain contact between the heat exchanger 86 and the cold tip 84. An optional thin Indium sheet, high thermally conductive cryogenic grease, or thermal paste can be inserted between the cold tip 84 surface and the coiled heat exchanger 86 to improve thermal conductance. The interior of the device can be maintained as a vacuum, i.e., the heat exchanger 86, cold tip 84, etc. are within a vacuum chamber.

Figure 8:
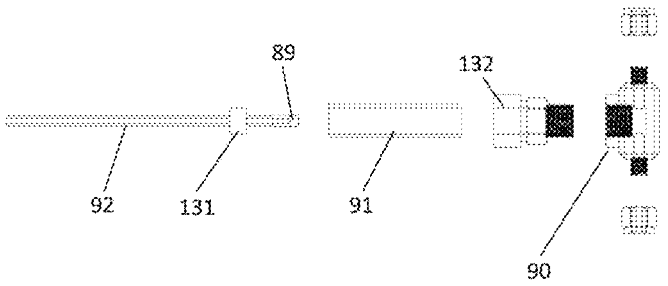
FIG. 8 illustrates an exploded view of a liquid/vapor sensor.
Figure 9:
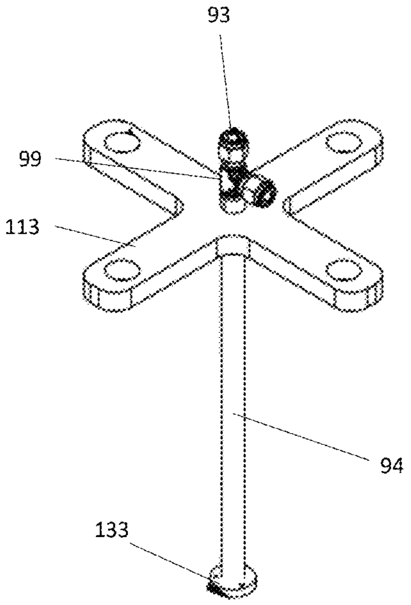
FIG. 9 illustrates a vapor cooled nozzle assembly.

A sensor 89, such as a liquid-vapor sensor, is installed directly in the flow of hydrogen to detect liquid or vapor through self-heating. The sensor is installed at the tip of a hermetically sealed two-pin feed-through 131, which is welded into a tube 91 that is then swage sealed using swage fitting 132 into a tee 90. The swage filling allows replacement of the sensor as needed. The sensor excitation and sensing wires 92 pass through the outer wall 83 of the device and are measured outside of the device. FIG. 8 shows an exploded view of the liquid-vapor sensor assembly.

A liquid feed nozzle 93 is installed on a nozzle thrust plate 113 into which a jacket tee 99 is connected or welded into the thrust plate 113. The thrust plate 113 is mechanically connected to top plate 82 by one or more connecting rods 114 (a single rod 114 is illustrated in FIG. 7 for ease of illustration, however, multiple rods can be used to create a rigid connection between top plate 82 and thrust plate 113). The thrust plate 113 is configured to absorb any impact resulting from connecting the nozzle 93 and/or gas recapture tube 94 to the UAV tank 98. Liquid hydrogen drips from the nozzle 93 and into the tank 98. The jacket tee 99 surrounds the feed nozzle 93 and has an internal diameter larger than the feed nozzle 93, which creates a gas flow chamber to allow hydrogen vapor to pass between the exterior of the feed nozzle 93 and the interior of the jacket tee 99 to return to its source via recirculating leg 99*a* of jacket tee 99 to a coiled vapor cooled shield 112, which is a second, larger heat exchanger within the vacuum chamber. The vapor cooled shield 112 may be composed of copper tubing or a solid wall with cooling passages within. The vapor cooled shield 112 can be covered in double aluminized Mylar multilayer insulation or aluminum foil to act as a radiation barrier cold wall. Insulation material 111 can be added to the interior of the device at various locations, such as between the vapor cooled shield 112 and the interior wall 83 of the device, and around the heat exchanger 86, to help maintain the low temperature.

Figure 10:
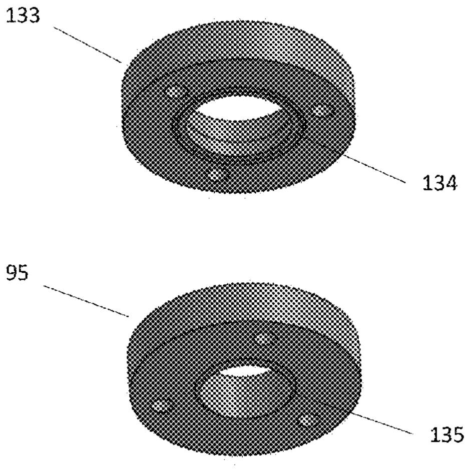
FIG. 10 illustrates vapor cooled nozzle flange and seal.

In use, an air-tight connection between the apparatus 80 and a vehicle in which the tank 98 is installed is established. Once connected, liquid hydrogen flows through the nozzle 93 and into the Flight Storage System (FSS) inner tank 98 of the vehicle. The inner tank 98 can be vacuum jacketed 97. A vacuum is maintained between the FSS and the hydrogen recirculation apparatus 80 using a vacuum seal 96, such as, for example, a KF50 vacuum crush seal. A cryogenic fluid seal 95 seals on knife edges on the nozzle flange 133 and the FSS fill tube extension. FIG. 10 shows the nozzle flange 133 with knife edge 134 and the cryogenic fluid seal 95 with alignment feature 135 for insertion into the FSS fill tube extension. Gas can exit the tank 98, and is captured or collected in gas recapture tube 94, which connects with jacket tee 99, which feeds the gas, via recirculating leg 99*a*, to the coiled vapor cooled shield 112. Vent gas exits the vapor cooled shield 112 through the discharge line 101. The gas can be warmed up using heat exchanger 102. The heat exchanger 102 can heat the gas to a sufficient temperature, if necessary, to avoid damaging equipment that is not rated for cryogenic temperatures, such as the recirculating means 103. The gas can be vented via vent valve 109, or the gas can be recycled or recirculated in the system.

An open looped system of hydrogen flowing into the tank of a vehicle, liquifying, chilling other parts of the system including the FSS inner tank and then venting is known. The device 80 uses a recirculating means 103 such as a blower or pump 103 that circulates the captured hydrogen gas throughout the system until the entire system including the FSS inner tank 98 is cooled sufficiently to begin collecting liquid. The sensor 89 senses when liquid hydrogen flows past the sensor 89, indicating the desired temperature has been reached. Once the system has reached the desired temperature, additional gas can be added to the system using storage tank 104 through isolation valve 106, and regulator 108. Alternatively, gaseous helium 105 can be used through isolation valve 107 and regulator 108 to cool the system in a closed loop until sufficiently chilled at which point the helium can be vented and hydrogen can be introduced.

Definitions

The following includes definitions of selected terms employed herein. The definitions include various examples or forms of components that fall within the scope of a term and that may be used for implementation. The examples are not intended to be limiting. Both singular and plural forms of terms may be within the definitions.

As used herein, an "operable connection" or "operable coupling," or a connection by which entities are "operably connected" or "operably coupled" is one in which the entities are connected in such a way that the entities may perform as intended. An operable connection may be a direct connection or an indirect connection in which an intermediate entity or entities cooperate or otherwise are part of the connection or are in between the operably connected entities. In the context of signals, an "operable connection," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and so on, have been illustrated by describing examples, and while the examples have been described in considerable detail, it is not the intention of the applicants to restrict or in any way limit scope to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

What is claimed is:

1. A refueling system for vehicles, comprising:

an inlet tube configured to fluidly connect to a container containing gaseous hydrogen;

a cryocooler including a cold tip and a cold head, the cold tip configured to be driven to a hydrogen liquefaction temperature of between 20 and 25 K by the cold head;

a condensation coil fluidly connected to the inlet tube to receive the gaseous hydrogen and thermally connected to the cryocooler cold tip;

a nozzle fluidly connected to the condensation coil and configured to receive liquid hydrogen from the condensation of the gaseous hydrogen;

a coupling mechanism fluidly connected to the nozzle to receive the liquid hydrogen wherein the nozzle is downwardly movable to fluidly connect from above to an upwards facing tank inlet of a vehicle;

a gas recapture tube configured to fluidly connect to the tank inlet of the vehicle and configured to capture gas released from the tank; and an outlet tube fluidly connected to the gas recapture tube, and a recirculation loop tube fluidly connected to the outlet tube and the inlet tube.

2. The refueling system of claim 1, further comprising:

a sensor disposed between the condensation coil and the nozzle configured to detect the presence of liquid hydrogen.

3. The refueling system of claim 1, wherein the circulation loop includes a circulating means configured to move gas from the outlet tube to the inlet tube.

4. The refueling system of claim 3, wherein the circulating means is selected from a blower and a pump.

5. The refueling system of claim 1, wherein the recirculation loop includes a heat exchanger.

6. The refueling system of claim 1, wherein the nozzle is disposed through the gas recapture tube, wherein an outer surface of the nozzle and an inner surface of the gas recapture tube define a flow chamber configured to allow gas to enter the chamber from the tank.

7. The refueling system of claim 6, wherein the gas recapture tube further includes a recirculating leg tube fluidly connected to the outlet tube and the flow chamber.

8. The refueling system of claim 1, wherein the recirculation loop further includes a vent valve configured to vent gas from the system.

9. The refueling system of claim 1, further comprising:

one or more mechanical fasteners that secure the condensation coil to the cryocooler cold tip, the fastener configured to maintain force on the condensation coil to maintain contact between the condensation coil and the cold tip.

10. The refueling system of claim 9, wherein the mechanical fastener is selected from a constant-tension bolt clamp and spring clamp.

11. The refueling system of claim 1, further comprising:

a seal between the nozzle and the tank inlet.

12. The refueling system of claim 1, further comprising:

a vapor-cooled shield fluidly connected to the gas recapture tube and to the outlet tube.

* * * * *